United States Patent
Song et al.

(10) Patent No.: US 9,363,079 B2
(45) Date of Patent: Jun. 7, 2016

(54) METHOD OF GENERATING MESSAGE AUTHENTICATION CODE AND AUTHENTICATION DEVICE AND AUTHENTICATION REQUEST DEVICE USING THE METHOD

(71) Applicant: SILICON WORKS CO., LTD., Daejeon (KR)

(72) Inventors: Myoung Soo Song, Daejeon (KR); Jae Wan Kim, Daejeon (KR); Young Suk Son, Daejeon (KR); Hyung Seog Oh, Daejeon (KR)

(73) Assignee: SILICON WORKS CO., LTD. (KR)

( * ) Notice: Subject to any disclaimer, the term of this patent is extended or adjusted under 35 U.S.C. 154(b) by 123 days.

(21) Appl. No.: 14/280,898

(22) Filed: May 19, 2014

(65) Prior Publication Data

US 2014/0341373 A1    Nov. 20, 2014

(30) Foreign Application Priority Data

May 20, 2013  (KR) .................. 10-2013-0056629
Dec. 16, 2013  (KR) .................. 10-2013-0156612

(51) Int. Cl.
*H04K 1/00* (2006.01)
*H04L 9/08* (2006.01)
*H04L 9/32* (2006.01)

(52) U.S. Cl.
CPC ............ *H04L 9/0869* (2013.01); *H04L 9/3239* (2013.01); *H04L 9/3242* (2013.01)

(58) Field of Classification Search
CPC ... H04L 9/0869; H04L 9/3242; H04L 9/3239; H04L 9/06; H04L 9/00; H04L 9/30; H04L 9/18; G06F 7/725
USPC .......................................................... 380/28
See application file for complete search history.

(56) References Cited

U.S. PATENT DOCUMENTS

2005/0203582 A1*  9/2005  Healy ................ A61N 1/37211
                                                          607/31

FOREIGN PATENT DOCUMENTS

KR          100655051          11/2006

* cited by examiner

*Primary Examiner* — Baotran N To
(74) *Attorney, Agent, or Firm* — Onello & Mello, LLP

(57) ABSTRACT

Provided are a method of generating a message authentication code and an authentication device and an authentication request device using the method. The method includes generating a second secret key by encrypting seed data, a first secret key, and first auxiliary data using an encryption algorithm; and encrypting the seed data, the second secret key, and second auxiliary data using the encryption algorithm, wherein the encryption algorithm receives data of a preset base number of bits and encrypts the received data, and the number of bits of the second auxiliary data varies according to a difference between the number of bits of the first secret key and the number of bits of the second secret key.

20 Claims, 8 Drawing Sheets

Enter any message to check its SHA-1 hash

Message: No one is permitted to reproduce and duplicate, in any form, the whole or part of this document without written approval of Silicon Works.

Generate Hash    610

Hash: 8d85700d947ebad36272a5969b8d5fc7fc16734a

Note SHA-1 hash of 'abc' should be: a9993e364706816aba3e25717850c26c9cd0d89d

DIFFERENCE

Enter any message to check its SHA-1 hash

Message: No one is permitted to reproduce and duplicate, in any form, the whole or part of this document without written approval of Silicon Works"

Generate Hash    620

Hash: 56a2bddcf72cef1fac0a1345d6e292eee4d0f3eb

Note SHA-1 hash of 'abc' should be: a9993e364706816aba3e25717850c26c9cd0d89d

FIG. 8

METHOD OF GENERATING MESSAGE AUTHENTICATION CODE AND AUTHENTICATION DEVICE AND AUTHENTICATION REQUEST DEVICE USING THE METHOD

This application claims priority from Korean Patent Application No. 10-2013-0056629 filed on May 20, 2013 and 10-2013-0156612 filed on Dec. 16, 2013 in the Korean Intellectual Property Office, the disclosures of which are incorporated herein by reference in their entireties.

BACKGROUND OF THE INVENTIVE CONCEPT

1. Field of the Inventive Concept

The present inventive concept relates to a method of generating a message authentication code and an authentication device and an authentication request device using the method.

2. Description of the Related Art

Generally, an electronic device interworks with peripheral devices, such as an accessory, a battery, etc.

The peripheral devices can be easily installed in or removed from the electronic device by anyone without any constraints. However, if a fake peripheral device is installed in the electronic device, the safety of the electronic device is undermined because the electronic device can malfunction or overheat, thus causing a user harm. However, there is no technology for distinguishing genuine peripheral devices from fake peripheral devices.

Korean Patent Registration No. 10-0655051 discloses an apparatus and method for authenticating a peripheral device of a mobile communication terminal using electronic tag technology.

Korean Patent Registration No. 10-0655051 discloses a technology of verifying the authenticity of a battery that is to be installed in a mobile terminal by simply using electronic tag technology. However, since electronic tags can be easily forged or copied, an authentication method that can ensure greater security is required.

SUMMARY OF THE INVENTIVE CONCEPT

Aspects of the present inventive concept provide a method of authenticating a peripheral device using an authentication device by generating a message authentication code in a challenge-response way.

However, aspects of the present inventive concept are not restricted to the embodiments set forth herein. The above and other aspects of the present inventive concept will become more apparent to one of ordinary skill in the art to which the present inventive concept pertains by referencing the detailed description of the present inventive concept given below.

According to an aspect of the present inventive concept, there is provided a method of generating a message authentication code. The method includes: generating a second secret key by encrypting seed data, a first secret key, and first auxiliary data using an encryption algorithm; and encrypting the seed data, the second secret key, and second auxiliary data using the encryption algorithm, wherein the encryption algorithm receives data of a preset base number of bits and encrypts the received data, and the number of bits of the second auxiliary data varies according to a difference between the number of bits of the first secret key and the number of bits of the second secret key.

According to another aspect of the present inventive concept, there is provided an authentication device including: an encryption unit which generates a second secret key by encrypting seed data, a first secret key, and first auxiliary data using an encryption algorithm and generates a first message authentication code by encrypting the seed data, the second secret key, and second auxiliary data using the encryption algorithm; and an authentication unit which authenticates an authentication request device by comparing the generated first message authentication code with a second message authentication code received from the authentication request device, wherein the encryption algorithm receives data of a preset base number of bits and encrypts the received data, and the number of bits of the second auxiliary data varies according to a difference between the number of bits of the first secret key and the number of bits of the second secret key.

According to still another aspect of the present inventive concept, there is provided an authentication request device including: a reception unit which receives generated seed data from an authentication device; an encryption unit which generates a second secret key by encrypting the seed data, a first secret key, and first auxiliary data using an encryption algorithm and generates a message authentication code by encrypting the seed data, the second secret key, and second auxiliary data using the encryption algorithm; and a transmission unit which transmits the generated message authentication code to the authentication device, wherein the encryption algorithm receives data of a preset base number of bits and encrypts the received data, and the number of bits of the second auxiliary data varies according to a difference between the number of bits of the first secret key and the number of bits of the second secret key.

BRIEF DESCRIPTION OF THE DRAWINGS

The above and other aspects and features of the present inventive concept will become more apparent by describing in detail exemplary embodiments thereof with reference to the attached drawings, in which.

DETAILED DESCRIPTION OF THE INVENTIVE CONCEPT

The contents below illustrate only the principle of the present inventive concept and various representative embodiments in accordance therewith. Therefore, one of ordinary skill in the art will understand that the principle of the present inventive concept can be embodiment in various methods and apparatuses included in the spirit and scope of the present inventive concept. In addition, it should be understood in principle that all conditional terms and embodiments described in the specification are intended to convey an understanding of the spirit of the present inventive concept, which is not limited to the specifically described embodiments and states.

The objectives, features and advantages of the present inventive concept will become more apparent by describing in detail embodiments thereof with reference to the attached drawings. Accordingly, the technical spirit of the present inventive concept will be readily apparent to those of ordinary skill in the art to which the present inventive concept pertains.

In addition, a detailed description might be omitted when such subject matter it is readily understood in the field or from the related prior art or when a detailed description of a structure may unnecessarily obscure the understanding or clarity of the present inventive concept.

As used herein, the singular forms "a", "an" and "the" are intended to include the plural forms as well, unless the context clearly indicates otherwise. It will be further understood that the terms "composed of," "comprising," and/or "includes," and various forms thereof, when used in this specification and the claims, specify the presence of stated components or steps, but do not preclude the presence or addition of one or more other components or steps.

The term "encryption," as used herein, refers to the process of electronically converting information into an unreadable form (ciphertext). Information stored in a memory (e.g., a computer memory) or transferred through a communication line or path in the form of ciphertext can be protected.

The term "decryption," as used herein, refers to the reverse process of the encryption process, that is, the process of electronically converting ciphertext into plaintext using a decryption algorithm. Encryption schemes may broadly be classified into a symmetric key encryption scheme and an asymmetric key encryption scheme. The symmetric key encryption scheme uses the same key in encryption and decryption, whereas the asymmetric key encryption scheme uses different keys in encryption and decryption.

In embodiments of the present inventive concept, an encryption method using a method of generating a message authentication code will be described. Here, the encryption method may use the symmetric key encryption scheme and can reduce hardware complexity and minimize an increase in calculation time.

The present inventive concept will now be described more fully with reference to the accompanying drawings, in which exemplary embodiments of the inventive concept are shown.

Figure 1:
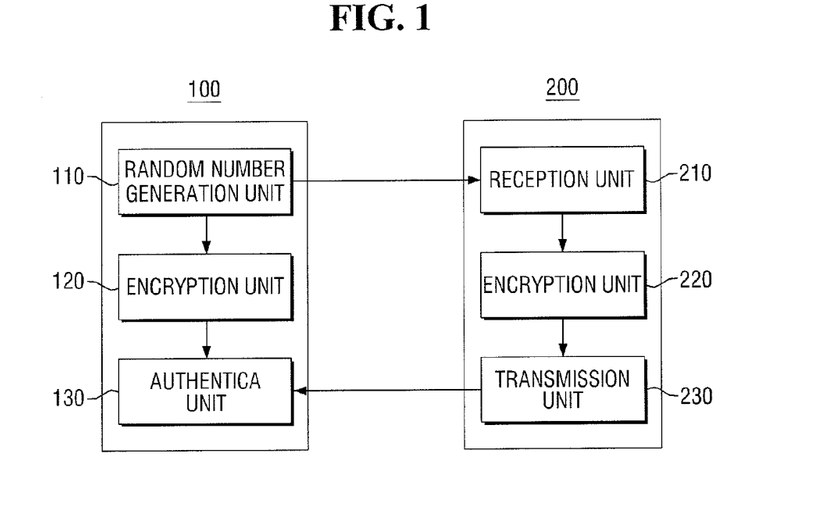
FIG. 1 is a block diagram of an authentication system using a method of generating a message authentication code according to an embodiment of the present inventive concept.

FIG. 1 is a block diagram of an authentication system using a method of generating a message authentication code according to an embodiment of the present inventive concept.

Referring to FIG. 1, the authentication system according to the current embodiment includes an authentication device 100 and an authentication request device (a peripheral device) 200.

The authentication device 100 and the authentication request device 200, which may be connected to the authentication device 100, may communicate with each other. Through this communication, the authentication device 100 can identify whether the authentication request device 200 is genuine.

The authentication device 100 may be implemented in various forms. For example, the authentication device 100 may be implemented in the form of a mobile phone, a smartphone, a notebook computer, a digital broadcasting terminal, a personal digital assistant (PDA), a portable media player (PMP), a navigation system, a tablet personal computer (PC), a media player, such as television, a printer, an electric vehicle, an electric bicycle, etc.

The authentication request device 200 may be a device that is electrically connected to (e.g., installed or mounted in or coupled to) the authentication device 100 so as to interwork with the authentication device 100. Examples of the authentication request device 200 may include, but are not limited to, a battery, a universal serial bus (USB) device, a game console, a printer cartridge, and various accessories, a speaker, a remote control, etc. installed in or coupled to the authentication device 100.

The authentication device 100 according to the current embodiment includes a random number generation unit 110, an encryption unit 120, and an authentication unit 130. The authentication request device 200 includes a reception unit 210, an encryption unit 220, and a transmission unit 230.

That is, when receiving an authentication request from the authentication request device 200, the random number generation unit 110 of the authentication device 100 generates a random number and transmits the generated random number to the reception unit 210 of the authentication request device 200.

When a random number is generated or received, each of the encryption units 120 and 220 performs encryption using the random number and generates a message authentication code. When a message authentication code is generated, the transmission unit 230 of the authentication request device 200 transmits the generated message authentication code to the authentication device 100.

Here, a process in which the authentication device 100 generates a random number and transmits the generated random number is referred to as a 'challenge,' and a process in which the authentication request device 200 transmits a generated message authentication code to the authentication device 100 is referred to as a 'response.' The two processes are collectively referred to as a "challenge-response" way, method, or approach.

The authentication unit 130 of the authentication device 100 authenticates the authentication request device 200 by comparing a message authentication code received as a response with a message authentication code generated by the encryption unit 120 of the authentication device 100.

A method of generating a message authentication code using the encryption unit 120 or 220 of the authentication device 100 or the authentication request device 200 according to an embodiment of the present inventive concept will now be described in detail with reference to FIG. 2.

Figure 2:
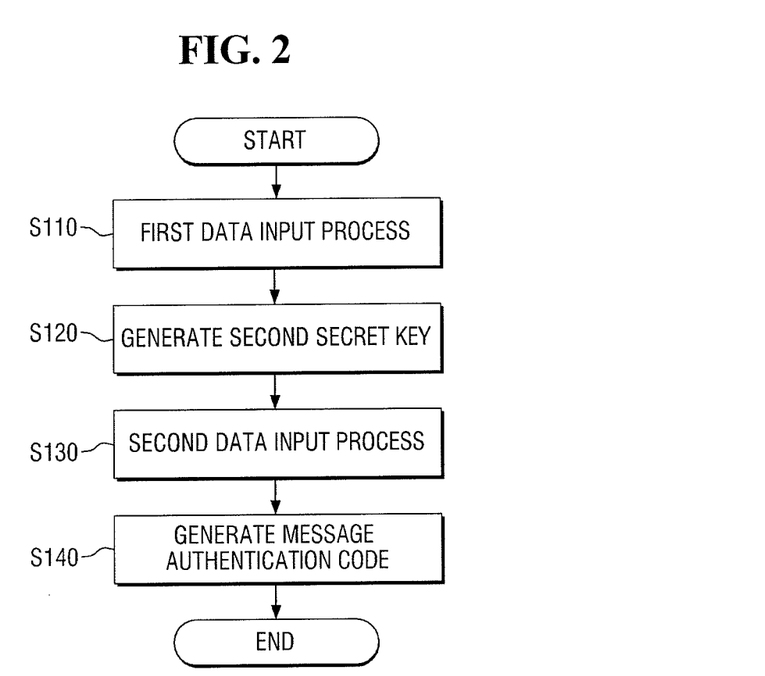
FIG. 2 is a flowchart illustrating a method of generating a message authentication code according to an embodiment of the present inventive concept.

Referring to FIG. 2, the method of generating a message authentication code according to the current embodiment includes performing a first data input process (operation S110), generating a second secret key (operation S120), performing a second data input process (operation S130), and generating a message authentication code (operation S140).

In the performing of the first data input process (operation S110), a value needed to generate the second secret key in the generating of the second secret key (operation S120) is input.

Specifically, in the current embodiment, an encryption algorithm receives seed data, a first secret key, and first auxiliary data for filling a pre-determined (or preset) number of bits in order to generate the second secret key.

In the generating of the second secret key (operation S120), the second secret key is generated using data input in the performing of the first data input process according to the encryption algorithm (operation S110).

In the current embodiment, the encryption algorithm may be an algorithm for performing encryption using data of a predetermined base number of bits as an input value, more specifically, a hash algorithm for converting data of an input base number of bits into data of a predetermined output base number of bits.

Figure 4A:
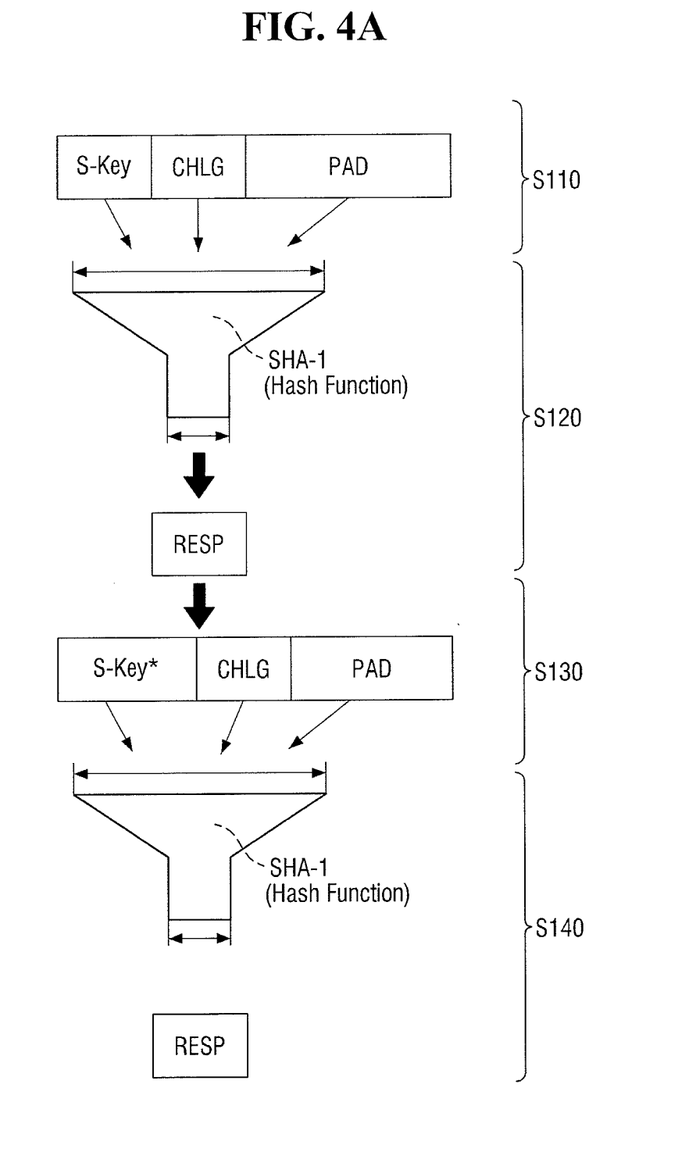
FIGS. 4A and 4B are flowcharts illustrating, in more detail, the message authentication code generation method of FIG. 2.
Figure 4B:
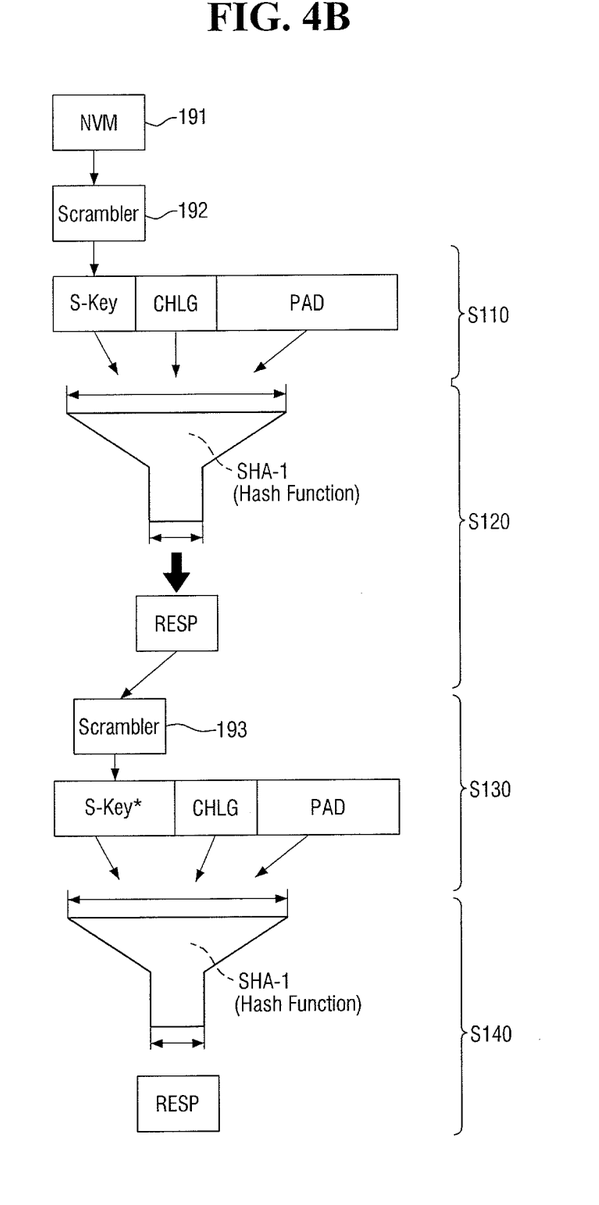

That is, according to the current embodiment, to make it difficult to infer an input value from an output value, a hash function having unidirectional characteristics may be used as the encryption algorithm. The hash function having unidirectional characteristics may be Message-Digest algorithm 4 (MD4), Message-Digest algorithm 5 (MD5), Secure Hash Algorithm (SHA)-1, SHA-512, Cyclical Redundancy Check (CRC), etc. In FIGS. 4A and 4B, SHA-1 is used as the encryption algorithm according to the current embodiment.

Referring to FIGS. 4A and 4B, the encryption algorithm according to the current embodiment is an algorithm for converting data of an input base number of bits input in the performing of the first data input process (operation S110) into data of a predetermined output base number of bits. For example, the encryption algorithm may convert data of a predetermined base number (n) of bits into data of 160 bits.

Therefore, in the performing of the first data input process (operation S110), a first secret key S-Key of s bits, a challenge value CHLG of c bits, and (n-s-c) first dummy bits PAD for filling the n bits are input. Here, the first dummy bits PAD may be the first auxiliary data.

Seed data used to perform encryption may be random number information generated by the random number generation unit 110 of FIG. 1 or received by the reception unit 210 and may include a challenge value. In the current embodiment, auxiliary data is data for filling the base number of bits. In addition, bits excluding bits occupied by the seed data and the first or second secret key are dummy-processed. That is, bits (i.e., (n-s-c) bits) corresponding to the remaining data may be padded to zero.

Referring to FIG. 4B, a first secret key S-Key may be stored in a storage device, e.g., a non-volatile memory 191. The first secret key S-Key may be scrambled by a first scrambler 192. The first scrambler 192 may be operated selectively by an instruction signal from a user. That is, the first scrambler 192 may operate only when receiving the instruction signal from the user. In addition, the first scrambler 192 may include a plurality of scrambling schemes and perform a scrambling operation using at least one scrambling scheme selected by the user.

Also, a generated second secret key RESP or S-Key* may be scrambled by a second scrambler 193. The first scrambler 192 and the second scrambler 193 may be the same or different.

Unlike the illustration of FIG. 4B, not all of the first scrambler 192 and the second scrambler 193 may be provided. Instead, only the first scrambler 192 or the second scrambler 193 may be provided.

The scramblers 192 and 193 may further increase the security of the secret keys S-Key and S-Key*. This is because even if a hacker finds out a secret key and the fact that the SHA algorithm is used, it is very difficult for the hacker to do hacking if the hacker does not know about the scrambling operation.

In the current embodiment, scrambling rules may be set or reset by upgrading firmware of the authentication device 100.

Referring back to FIG. 2, in the generating of the second secret key (operation S120), encryption is performed using the seed data, the first secret key, and the first auxiliary data for filling a predetermined base number of bits as an input value according to the encryption algorithm that uses data of the predetermined base number of bits as an input value. The number of bits of the first auxiliary data may be determined by a difference between the base number of bits and the sum of the number of bits of the seed data and the number of bits of the first secret key.

In the performing of the second data input process (operation S130), the seed data, the second secret key generated in the generating of the second secret key (operation S120) and second auxiliary data corresponding to a difference between the number of bits of the first secret key and the number of bits of the second secret key are input. That is, the number of bits of the first auxiliary data and the number of bits of the second auxiliary data may be different.

Specifically, the same seed data as the seed data input in the performing of the first data input process (operation S110) is input, and the second secret key generated in the generating of the second secret key (operation S120) is input instead of the first secret key. Here, since the second secret key is input instead of the first secret key, the second auxiliary data corresponding to the difference between the number of bits of the first secret key and the number of bits of the second secret key is input. That is, the number of bits of the second auxiliary data may depend on the difference between the number of bits of the first secret key and the number of bits of the second secret key.

Referring to FIGS. 4A and 4B, the first secret key input in the performing of the first data input process (operation S110) has s bits, but the second secret key has 160 bits. That is, the s bits of the first secret key have been increased to the 160 bits of the second secret key by the encryption algorithm. Therefore, in one embodiment, the second auxiliary data may have 288 bits by reflecting an increase of 96 bits.

In the current embodiment, the second secret key may be input as it is. However, if the scrambling rule information is included in the seed data as described above, the locations of specific information values in the second secret key may be changed according to the scrambling rule information, and then the second secret key having the locations of the specific information values changed may be input.

In the generating of the message authentication code (operation S140), a message authentication code is generated by encrypting data input in the performing of the second data input process (operation S130).

In the current embodiment, a message authentication code is generated by performing an encryption process twice. However, the encryption process may be performed repeatedly if necessary, and the number of times the encryption process is to be performed may be included in the seed data. That is, if the seed data indicates that a message authentication code shall be generated by performing the encryption process three times, a message authentication code may be generated by utilizing the result of performing the encryption process using the second secret key as a third secret key.

That is, since the same encryption algorithm is used in the current embodiment, no additional memory or encryption module is required regardless of the number of times the encryption process is performed. This can reduce the implementation complexity of hardware or software and increase the security of a message authentication code without increasing cost.

Figure 3:
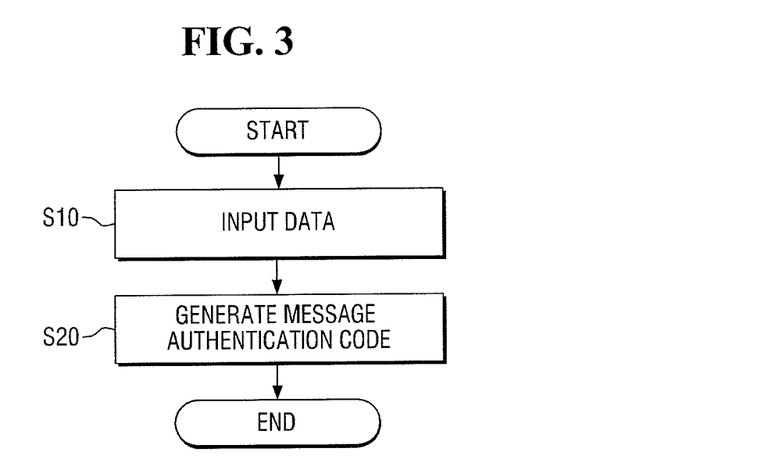
FIG. 3 is a flowchart illustrating a method of generating a message authentication code according to the comparison technology.

A method of generating a message authentication code according to the comparison technology will now be described with reference to FIG. 3. FIG. 3 is a method of generating a message authentication code using only a first secret key without generating a second secret key. The method of generating a message authentication code according to the current embodiment includes receiving a first secret key, seed data and auxiliary data (operation S10) and generating a message authentication code using the first secret key, the seed data and the auxiliary data (operation S20).

Figure 5:
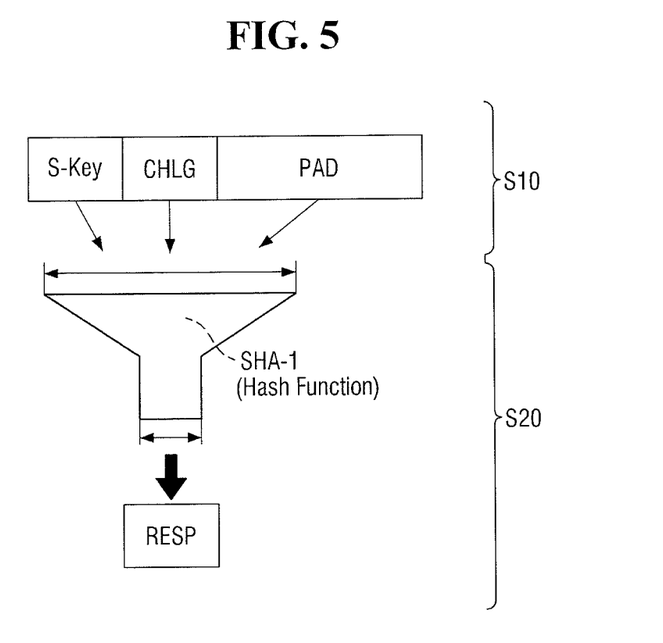
FIG. 5 is a flowchart illustrating, in more detail, the message authentication code generation method of FIG. 3.

If the same encryption algorithm as the encryption algorithm used in the embodiment of FIGS. 4A and 4B is utilized in the message authentication code generation method of FIG. 3 to generate a message authentication code, a message authentication code may be generated through the process illustrated in FIG. 5.

Referring to FIG. 5, an s-bit secret key S-Key and c-bit seed data are used as an input value of the encryption algorithm. Since the input value of the encryption algorithm has been determined to be n bits as in the above-described embodiment, bits (n-s-c=384 bits) corresponding to the remaining data may be padded to zero (dummy-processed). If the n-bit input value including the s-bit secret key and the c-bit seed data is input, a 160-bit output value is generated. In the message authentication code generation method of FIG. 5, the 160-bit output value is generated as a message authentication code.

If the embodiments of FIGS. 4A and 4B and 5 are compared, an encryption process is performed in each of operations S120 and S140 (i.e., performed twice) of FIGS. 4A and 4B, whereas the encryption process is performed once in operation S20 of FIG. 5.

According to the embodiment of FIGS. 4A and 4B, the first secret key S-Key can be inferred from the second secret key S-Key* for hacking purposes only after the second secret key SKey* is inferred from the message authentication code (that is, two inference processes are required).

On the other hand, according to the embodiment of FIG. 5, the secret key S-Key can be inferred directly from the message authentication code (that is, one inference process is required).

Therefore, the method of generating a message authentication code through one encryption process illustrated in FIG. 5 ensures greater security than the method of generating a message authentication code through two encryption processes illustrated in FIGS. 4A and 4B. In addition, since the number of bits of the second secret key S-Key* generated in FIGS. 4A and 4B is greater than the number of bits of the first secret key S-Key, the amount of calculation required to infer the second secret key S-Key* increases. Therefore, the method of FIGS. 4A and 4B can further ensure greater security than the method of FIG. 5 using information of the same number of bits as the number of bits of the first secret key.

A process in which the authentication device 100 of FIG. 1 authenticates the authentication request device 200 in a challenge-response way by using a message authentication code generated according to the above-described message authentication code generation method will now be described with reference to FIG. 6.

Figure 6:
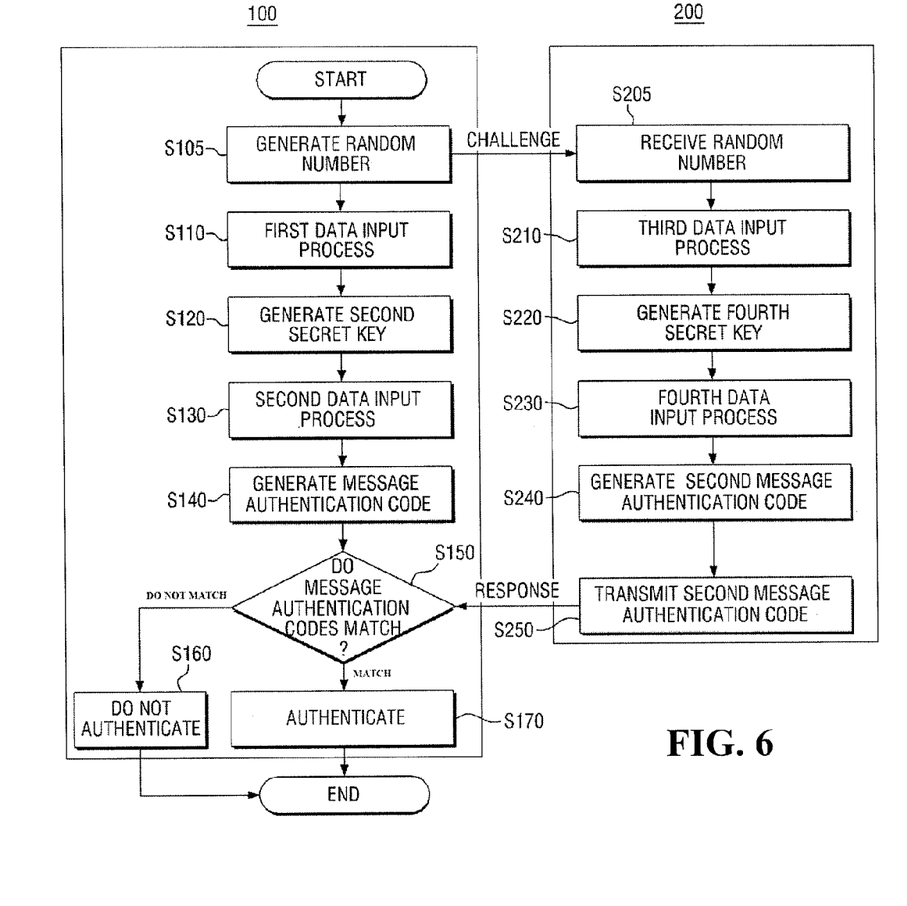
FIG. 6 is a flowchart illustrating an authentication process using a message authentication code according to an embodiment of the present inventive concept.

FIG. 6 is a flowchart illustrating an authentication process using a message authentication code according to an embodiment of the present inventive concept.

Referring to FIG. 6, when the authentication request device 200 according to the current embodiment sends an authentication request to the authentication device 100, the authentication device 100 generates a random number as seed data (operation S105). The seed data is a value randomly generated for each authentication process. The seed data may be a random number composed of a series of numbers or may be a combination of at least two of a number, a character, and a sign.

The generated seed data may be transmitted to the authentication request device 200 by the random number generation unit 110 (see FIG. 1). The seed data may be transmitted to the authentication request device 200 without being encrypted or may be transmitted to the authentication request device 200 after being encrypted. If the seed data is transmitted to the authentication request device 200 after being encrypted, the encryption unit 120 of the authentication device 100 can encrypt the seed data itself. In this case, the authentication request device 200 may further include a decryption unit (not illustrated) which can decrypt the encrypted seed data.

After the seed data is generated as the random number, a first secret key stored in a memory is read to generate a second secret key (operation S110). Here, the memory may be a non-volatile memory.

The first secret key may be stored in the memory in the form of a plaintext key but may also be stored in the memory after being encrypted or scrambled. Scrambling may include changing the locations of some data in a particular plaintext. For example, if the location of a $16^{th}$ bit value and the location of a $10^{th}$ bit value in a 16-bit plaintext are switched, it can be said that the plaintext has been scrambled. In the present specification, scrambling can also be understood as encryption in a broad sense. Therefore, scrambling will be expressed as encryption.

In the above embodiment, a case where the first secret key is encrypted and then stored in the memory is described as an example, but the present inventive concept is not limited to this example. In this case, rules or information for decrypting the encrypted first secret key into the original secret key (for convenience, will be referred to as a 'decrypted key') in the form of a plaintext key may be stored in the authentication device 100. The first secret key can have greater security when stored in the memory after being encrypted than when stored in the memory without being encrypted.

For example, if the first secret key is stored in the memory without being encrypted (that is, stored in the form of a plaintext key), it can be hacked by monitoring a transmission line or path through which the first secret key is transferred. To prevent the first secret key from being hacked, the first secret key may be stored in the memory after being encrypted.

After the first secret key stored in the memory is read, a second secret key is generated using the first secret key and the generated seed data (operation S120).

More specifically, in the generating of the second secret key (operation S120), the original decrypted key may be generated by decrypting the first secret key. In the generating of the second secret key (operation S120), the second secret key may be generated using the decrypted key and the seed data and then stored in a temporary volatile memory (not illustrated).

Next, the second secret key stored in the memory is read to generate a message authentication code, and the seed data and the second secret key are input (operation S130).

Then, a message authentication code is generated using the second secret key stored in the temporary memory and the generated seed data (operation S140). A particular encryption algorithm may be used in the generating of the second secret key (operation S120) and the generating of the message authentication code (operation S140).

Although a different encryption algorithm can be used in each of operations S120 and S140, the same encryption algorithm may be used in both operations S120 and S140 in order to reduce implementation complexity.

While the authentication device 100 is generating a message authentication code according to the above-described example, the authentication request device 200 also generates a message authentication code.

Referring to FIG. 6, the authentication request device 200 receives the random number generated in the generating of the random number of the authentication device 100 (operation S105) as seed data needed to generate a message authentication code of the authentication request device 200 (operation S205).

After the random number is received as the seed data, a third secret key stored in a memory is read in order to generate a fourth secret key (operation S210). Here, the memory may be a non-volatile memory.

After the third secret key stored in the memory is read, a fourth secret key is generated using the third secret key and the generated seed data (operation S220).

Then, the fourth secret key stored in the memory is read, and the seed data is input in order to generate a second message authentication code (operation S230).

A second message authentication code is generated using the fourth secret key stored in the temporary memory and the generated seed data (operation S240).

The second message authentication code generated in the generating of the second message authentication code (operation S240) is transmitted to the authentication device 100 (operation S250).

The authentication device 100 compares the generated first message authentication code with the received second message authentication code to identify whether the first message authentication code and the second message authentication code match each other (operation S150). If the first message authentication code and the second message authentication code match, the authentication device 100 authenticates the authentication request device 200 (operation S170). If not, the authentication device 100 does not authenticate the authentication request device 200 (operation S160).

In the above example, the authentication device 100 generates a random number as seed data and transmits the generated random number to the receiving side as a challenge, and the authentication device 100 generates a message response code using the seed data and transmits the message response code to the authentication device 100 as a response.

According to Mobile Industry Processor Interface (MIPI) Standard specifications, challenge and response signals may be exchanged between the authentication device 100 and the authentication request device 200 via a single wire using an MIPI protocol, but the present inventive concept is not limited thereto.

The response signal used in the authentication method according to the current embodiment is a generated message authentication code itself. Since there is no need to extract a secret key from the message authentication code for authentication purposes, the authentication process is simpler.

That is, referring to FIG. 6, after the generating of the first message authentication code (operation S140), the second message authentication code generated in the generating of the second message authentication code (operation S240) is received as a response and compared with the first message authentication code without a process of extracting a secret key.

Therefore, in the current embodiment, the authentication request device 200 can be authenticated through two encryption processes and one comparison process. In addition, since no additional decryption process is required, a simpler authentication process can be performed. Accordingly, this can reduce hardware and software overhead caused by authentication.

While a case where two encryption processes are performed has been described above, three or more encryption processes can also be performed.

In addition, since the same encryption algorithm is used in the two encryption processes, security can be significantly increased without requiring additional hardware.

The result of encryption according to the current embodiment will additionally be described with reference to FIG. 7.

Figure 7:
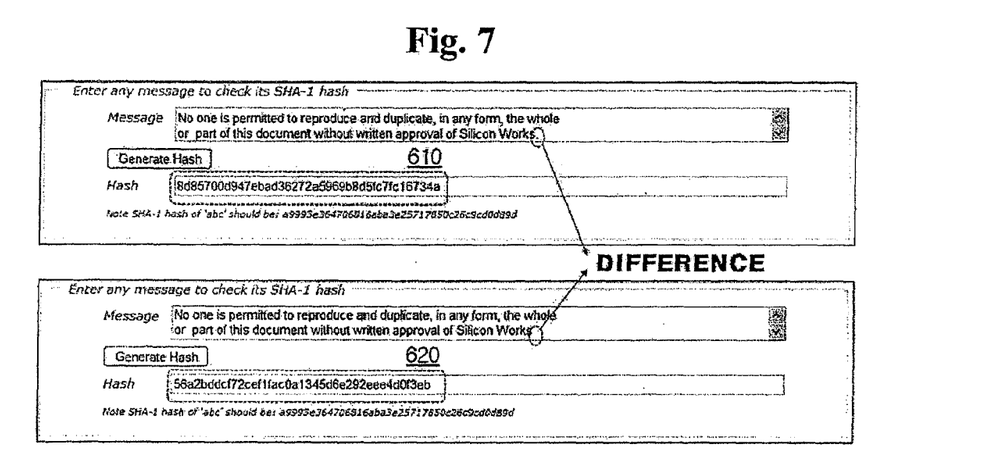
FIG. 7 is a diagram illustrating the result of implementing a method of generating a message authentication code according to an embodiment of the present inventive concept.

FIG. 7 is a diagram illustrating hash results generated using SHA-1 according to the above example. Referring to FIG. 7, a first input value and a second input value are the same value, and the only difference between them is a period. However, a first output value 610 and a second output value 620 respectively corresponding to the first input value and the second input value are totally different. Therefore, if encryption is performed using the message authentication code generation method according to the current embodiment, it is virtually impossible to infer an input value from an output value.

Although not illustrated in the drawing, according to another embodiment of the present inventive concept, different seed data may be used in the generating of the second secret key (operation S120) and the generating of the first message authentication code (operation S140). That is, first seed data may be used in the generating of the second secret key (operation S120), and second seed data may be used in the generating of the first message authentication code (operation S140). In this case, the second seed data may be generated using the first seed data.

As described above, a method of generating a message authentication code of an authentication (request) device according to an embodiment of the present inventive concept uses a different secret key in each authentication process. Therefore, it is possible to prevent the secret key from being hacked, thereby reducing the risk of reproduction or forgery of the authentication request device and saving cost.

In addition, the method of generating a message authentication code of the authentication (request) device can be recorded in a computer-readable recording medium in the form of program commands executed by means of various types of computer means. The computer-readable recording medium may include program commands, data files, data structures, etc. independently or in combination. The program commands recorded in the computer-readable recording medium can be designed and configured for dedicated use in the present inventive concept or the ones well-known to those in the computer software field.

The computer-readable recording medium may include magnetic media such as a hard disk, a floppy disk and magnetic tape, optical media such as a compact disk read-only memory (CD-ROM) and a digital versatile disk (DVD), magneto-optical media such as floptical disk, and hardware devices such as a ROM, a random-access memory (RAM), a flash memory, etc., particularly implemented to store and execute program commands.

The program commands can be machine language codes produced by a compiler and/or high-level programming language codes that can be executed by computers using an interpreter, etc. In order to perform the operations of the present inventive concept, the hardware devices may be implemented to operate as at least one software module, and vice versa.

Figure 8:
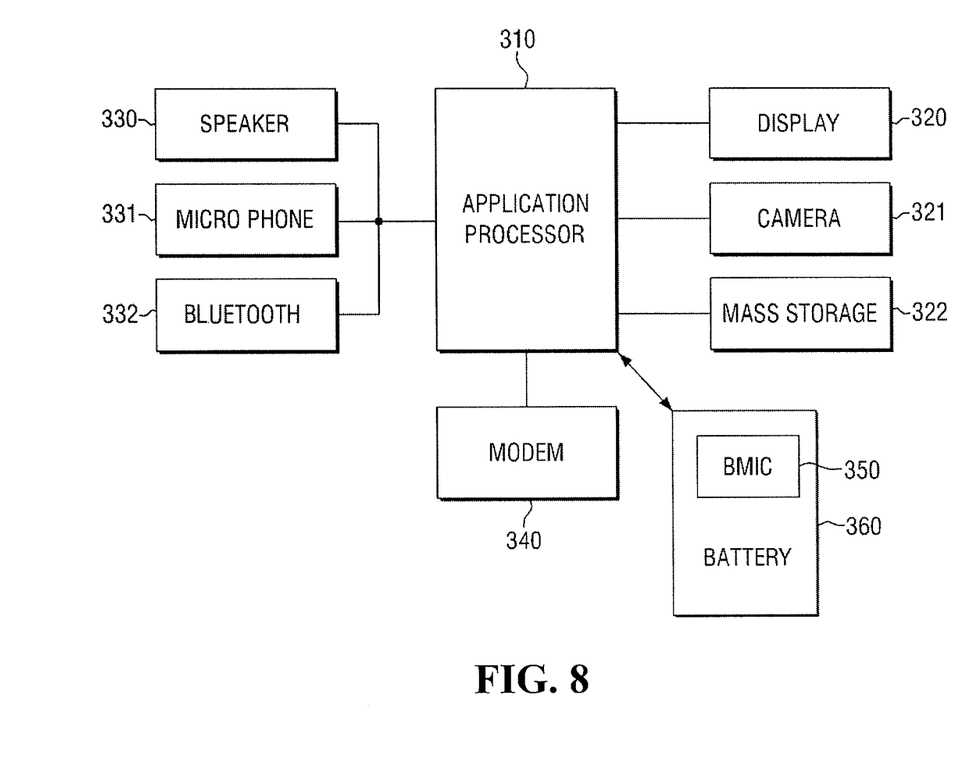
FIG. 8 is a block diagram of an authentication system according to embodiments of the present inventive concept.

FIG. 8 is a block diagram of an authentication system according to embodiments of the present inventive concept. In FIG. 8, part of a portable device is illustrated as an example.

Referring to FIG. 8, in the authentication system according to the embodiments of the present inventive concept, an application processor 310 may be connected to a modem 340, a display 320, a camera 321, a mass storage 322, a speaker 330, a microphone 331, a Bluetooth 332, etc. so as to control each of the above components and communicate with each of the above components. Although not illustrated in FIG. 8, a power amplifier, a switch, an antenna tuner, a global positioning system (GPS), near field communication (NFC), etc. may further be installed.

The authentication system according to the embodiments of the present inventive concept may further include a battery 360 and a battery management integrated circuit (BMIC) 350 which is included in the battery 360 and controls the battery 360. The BMIC 350 is an IC device needed to effectively use the energy of the battery 360. The BMIC 350 may include a gauging function, a cell balancing function, and an authentication function. The gauging function is to accurately estimate the available time of a battery by sensing the voltage, current, temperature, etc. of the battery. The cell balancing function is to adjust a voltage balance between a plurality of cells of the battery in order to improve the available capacity and useful life of the battery. The authentication function is to ensure the safety and satisfaction of a user by preventing the use of an illegal counterfeit battery that fails to meet mechanical and electrical safety standards.

The BMIC 350 and the application processor 310 may communicate with each other using a single wire interface. Since they communicate through one wire, a challenge of the BMIC 350 and a message response code (i.e., a response) of the application processor 310 are transmitted through the same wire. In FIG. 8, the BMIC 350 and the application processor 310 communicate with each other. However, the present inventive concept is not limited thereto. For example, the BMIC 350 may communicate with a power management IC (PMIC) of a portable device using a single wire interface.

In the authentication system according to the embodiments of the present inventive concept, the single wire interface may not be used in other parts of the authentication system, but the present inventive concept is not limited thereto. For example, the single wire interface may be different from an interface between the application processor 310 (or the PMIC) and the BMIC 350, an interface (e.g., a display serial interface (DSI)) between the application processor 310 and the display 320, or an interface (e.g., a universal flash storage (UFS)) between the application processor 310 and the mass storage 322.

A method of authenticating an authentication request device, an authentication request device, and an authentication device according to the present inventive concept may not be limited to the configurations and methods of the described embodiments. However, all or part of the embodiments may selectively be combined so as to implement various modifications.

According to the present inventive concept, a secret key varying according to a random number value is generated, and a message authentication code is generated using random number information and the generated secret key. Then, authentication is performed using the message authentication code. Therefore, authentication can be performed with increased security. In addition, since one encryption algorithm is repeatedly used by varying an input value, no additional memory or encryption module is required in a plurality of encryption processes, thereby saving cost.

What is claimed is:

1. A method of generating a message authentication code in a challenge-response authentication of an authentication request device by an authentication device, the method comprising:
generating, by the authentication device, a first message authentication code by an encryption unit generating a second secret key by encrypting seed data, a first secret key, and first auxiliary data using an encryption algorithm; and
encrypting, by the encryption unit, the seed data, the second secret key, and second auxiliary data using the encryption algorithm,
wherein the encryption algorithm receives data of a preset base number of bits and encrypts the received data, and the number of bits of the second auxiliary data varies according to a difference between the number of bits of the first secret key and the number of bits of the second secret key, the authentication device authenticating the authentication request device by comparing the generated first message authentication code with a second message authentication code received from the authentication request device.

2. The method of claim 1, wherein the encryption algorithm is a hash algorithm.

3. The method of claim 1, wherein the number of bits of the first auxiliary data is different from the number of bits of the second auxiliary data.

4. The method of claim 1, wherein the number of bits of the first auxiliary data is changed by a difference between the base number of bits and the sum of the number of bits of the seed data and the number of bits of the first secret key, and the number of bits of the second auxiliary data is changed by a difference between the base number of bits and the sum of the number of bits of the seed data and the number of bits of the second secret key.

5. The method of claim 4, wherein the first auxiliary data or the second auxiliary data has a dummy value.

6. The method of claim 1, further comprising receiving the seed data through a single wire interface.

7. The method of claim 6, wherein the first secret key or the second secret key is scrambled according to scrambling rules.

8. An authentication device comprising:
an application processor circuit including an encryption unit configured to generate a second secret key by encrypting seed data, a first secret key, and first auxiliary data using an encryption algorithm and to generate a first message authentication code by encrypting the seed data, the second secret key, and second auxiliary data using the encryption algorithm; and
the application processor circuit also including an authentication unit configured to authenticate an authentication request device by comparing the generated first message authentication code at the authentication device with a second message authentication code received from the authentication request device,
wherein the encryption algorithm receives data of a preset base number of bits and encrypts the received data, and the number of bits of the second auxiliary data varies according to a difference between the number of bits of the first secret key and the number of bits of the second secret key.

9. The authentication device of claim 8, wherein the encryption algorithm is a hash algorithm.

10. The authentication device of claim 8, wherein the number of bits of the first auxiliary data is different from the number of bits of the second auxiliary data.

11. The authentication device of claim 8, wherein the number of bits of the first auxiliary data is changed by a difference between the base number of bits and the sum of the number of bits of the seed data and the number of bits of the first secret key, and the number of bits of the second auxiliary data is changed by a difference between the base number of bits and the sum of the number of bits of the seed data and the number of bits of the second secret key.

12. The authentication device of claim 11, wherein the first auxiliary data or the second auxiliary data has a dummy value.

13. The authentication device of claim 8, wherein the authentication device performs communication using a single wire interface.

14. The authentication device of claim 13, wherein the first secret key or the second secret key is scrambled according to scrambling rules.

15. An authentication request device, comprising:
an integrated circuit including a reception unit configured to receive generated seed data from an authentication device;
the integrated circuit including an encryption unit configured to generate a second secret key by encrypting the seed data, a first secret key, and first auxiliary data using an encryption algorithm and configured to generate a message authentication code by encrypting the seed data, the second secret key, and second auxiliary data using the encryption algorithm; and
the integrated circuit including a transmission unit configured to transmit the generated message authentication code to the authentication device wherein the message authentication code is configured for comparison to a message authentication code generated in the authentication device,
wherein the encryption algorithm receives data of a preset base number of bits and encrypts the received data, and the number of bits of the second auxiliary data varies according to a difference between the number of bits of the first secret key and the number of bits of the second secret key.

16. The authentication request device of claim 15, wherein the encryption algorithm is a hash algorithm.

17. The authentication request device of claim 15, wherein the number of bits of the first auxiliary data is different from the number of bits of the second auxiliary data.

18. The authentication request device of claim 15, wherein the number of bits of the first auxiliary data is changed by a difference between the base number of bits and the sum of the number of bits of the seed data and the number of bits of the first secret key, and the number of bits of the second auxiliary data is changed by a difference between the base number of bits and the sum of the number of bits of the seed data and the number of bits of the second secret key.

19. The authentication request device of claim 18, being a battery management integrated circuit (BMIC) and being configured to perform communication using a single wire interface.

20. The authentication request device of claim 15, wherein the first secret key or the second secret key is scrambled according to scrambling rules.

* * * * *